(12) United States Patent
Schrage et al.

(10) Patent No.: US 9,769,307 B2
(45) Date of Patent: Sep. 19, 2017

(54) USER DETECTION AND RECOGNITION FOR ELECTRONIC DEVICES

(71) Applicant: Intel Corporation, Santa Clara, CA (US)

(72) Inventors: Chris L. Schrage, Folsom, CA (US); Jesus Fortu, Antelope, CA (US); Ofir Mulla, Petach Tikva (IL); Damian Munafo, Har-Hotzbim (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/998,071

(22) Filed: Dec. 26, 2015

(65) Prior Publication Data

US 2017/0187867 A1 Jun. 29, 2017

(51) Int. Cl.

| | | |
|---|---|---|
| *H04M 1/73* | (2006.01) | |
| *H04M 1/725* | (2006.01) | |
| *H04W 52/02* | (2009.01) | |

(52) U.S. Cl.
CPC ......... *H04M 1/72577* (2013.01); *H04M 1/73* (2013.01); *H04W 52/0254* (2013.01); *H04M 2250/12* (2013.01)

(58) Field of Classification Search
CPC ............... H04M 1/72577; H04M 1/73; H04M 2250/12; H04W 52/0254
See application file for complete search history.

(56) References Cited

U.S. PATENT DOCUMENTS

| | | | |
|---|---|---|---|
| 2013/0235234 A1* | 9/2013 | Cucci ................. | H04N 5/23206 348/231.99 |
| 2014/0300466 A1* | 10/2014 | Park ....................... | G08B 19/00 340/539.11 |

* cited by examiner

*Primary Examiner* — Chuong A Ngo
(74) *Attorney, Agent, or Firm* — Alpine Technology Law Group LLC

(57) ABSTRACT

In one example an electronic device comprises a proximity detector, a camera, and a controller, comprising logic, at least partly including hardware logic, to receive, from the proximity sensor, an indication that an object approaching the electronic device is within a predetermined distance while the electronic device is in a first low-power state, and in response to the indication, to activate the camera on the electronic device while the electronic device remains in a low-power state and determine whether an image input to the camera is a human while the electronic device remains in a low-power state. Other examples may be described.

18 Claims, 10 Drawing Sheets

USER DETECTION AND RECOGNITION FOR ELECTRONIC DEVICES

BACKGROUND

The subject matter described herein relates generally to the field of electronic devices and more particularly to user detection and recognition for electronic devices.

Electronic devices such as laptop computers, tablet computing devices, electronic readers, mobile phones, and the like may enter a low-power state when unused for a period of time and then recover to a full power state when a user initiates use of the electronic device. Some electronic devices include sensors such as proximity sensors and/or cameras. Accordingly, techniques which enable an electronic device incorporate inputs from such sensors for user detection and recognition of the electronic device may find utility, e.g., in transitioning an electronic device between low-power states and full-power states, or vice-versa.

BRIEF DESCRIPTION OF THE DRAWINGS

The detailed description is described with reference to the accompanying figures.

DETAILED DESCRIPTION

Described herein are exemplary systems and methods to implement a user detection and recognition in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide electronic devices with techniques for user detection and recognition which may be used to implement techniques for transitioning an electronic device between low-power states and full-power states, or vice-versa. The subject matter described herein addresses these and other issues by providing user detection and recognition algorithms which may be implemented in logic on one or more controllers of the electronic device. In some examples, an electronic device includes one or more sensors, e.g., a proximity sensor and one or more cameras. Logic associated with the electronic device receives, from the proximity sensor, an indication that an object approaching the electronic device is within a predetermined distance while the electronic device is in a first low-power state, and in response to the indication, to activate the camera on the electronic device; and transition the electronic device from the first low-power state to a second low-power state. Additional logic may evaluate image inputs to the camera to determine whether the object(s) detected by the proximity sensor are human and/or an authorized user of the electronic device and may respond by placing the electronic device into a higher power state and/or an operating state Additional features and operating characteristics of the user recognition and of electronic devices are described below with reference to FIGS. 1-10.

Figure 1:
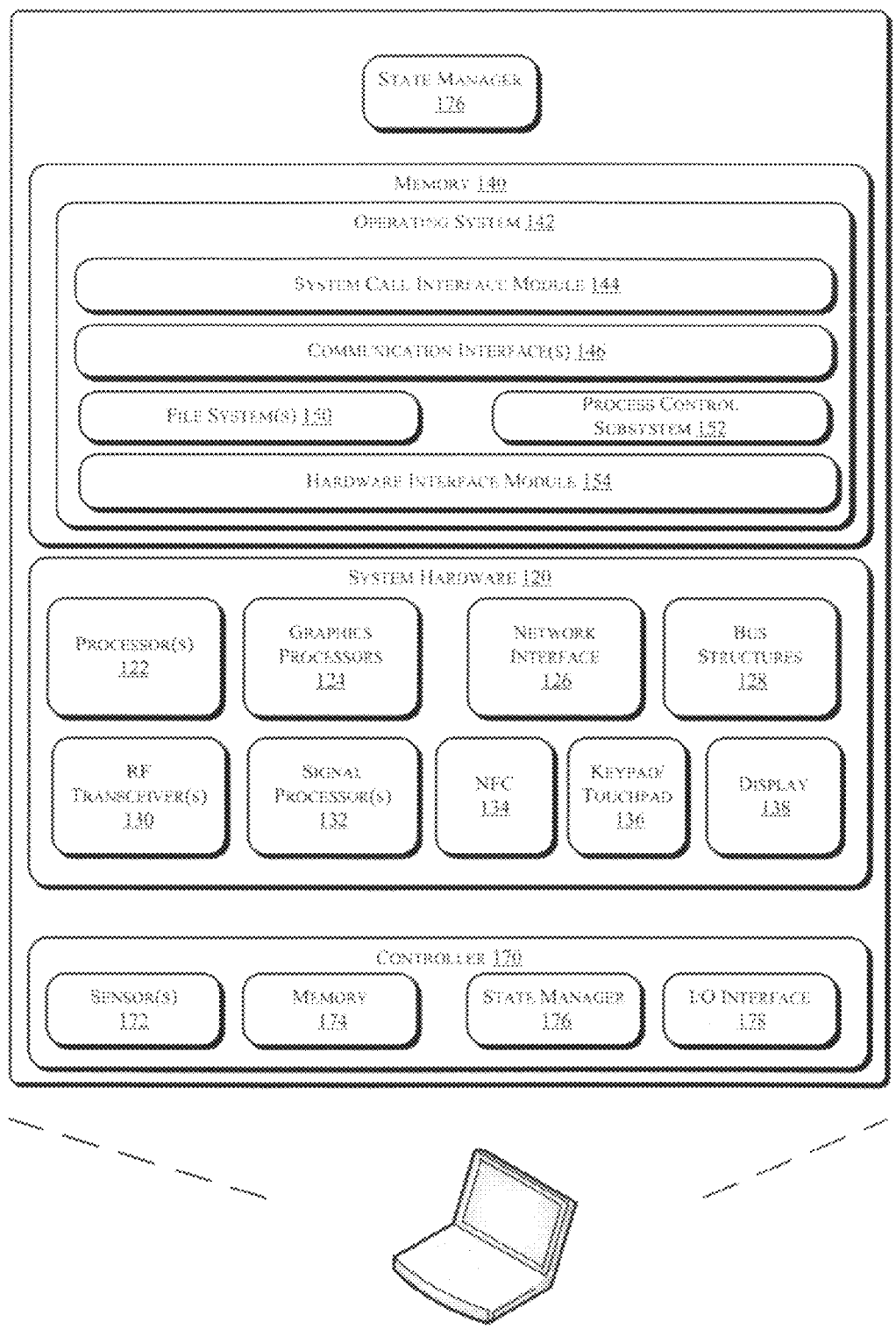
FIGS. 1-2 are schematic illustrations of exemplary electronic devices which may be adapted to implement user detection and recognition in accordance with some embodiments.

FIG. 1 is a schematic illustration of an electronic device 100 which may be adapted to include user detection and recognition in accordance with some examples. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Cor2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms In the embodiment depicted in FIG. 1 the controller 170 comprises a processor 172, a memory module 174, a state manager 176, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122. In some examples portions of the state manager 176 may reside in the memory 140 of electronic device 100 and may be executable on one or more of the processors 122.

Figure 2:
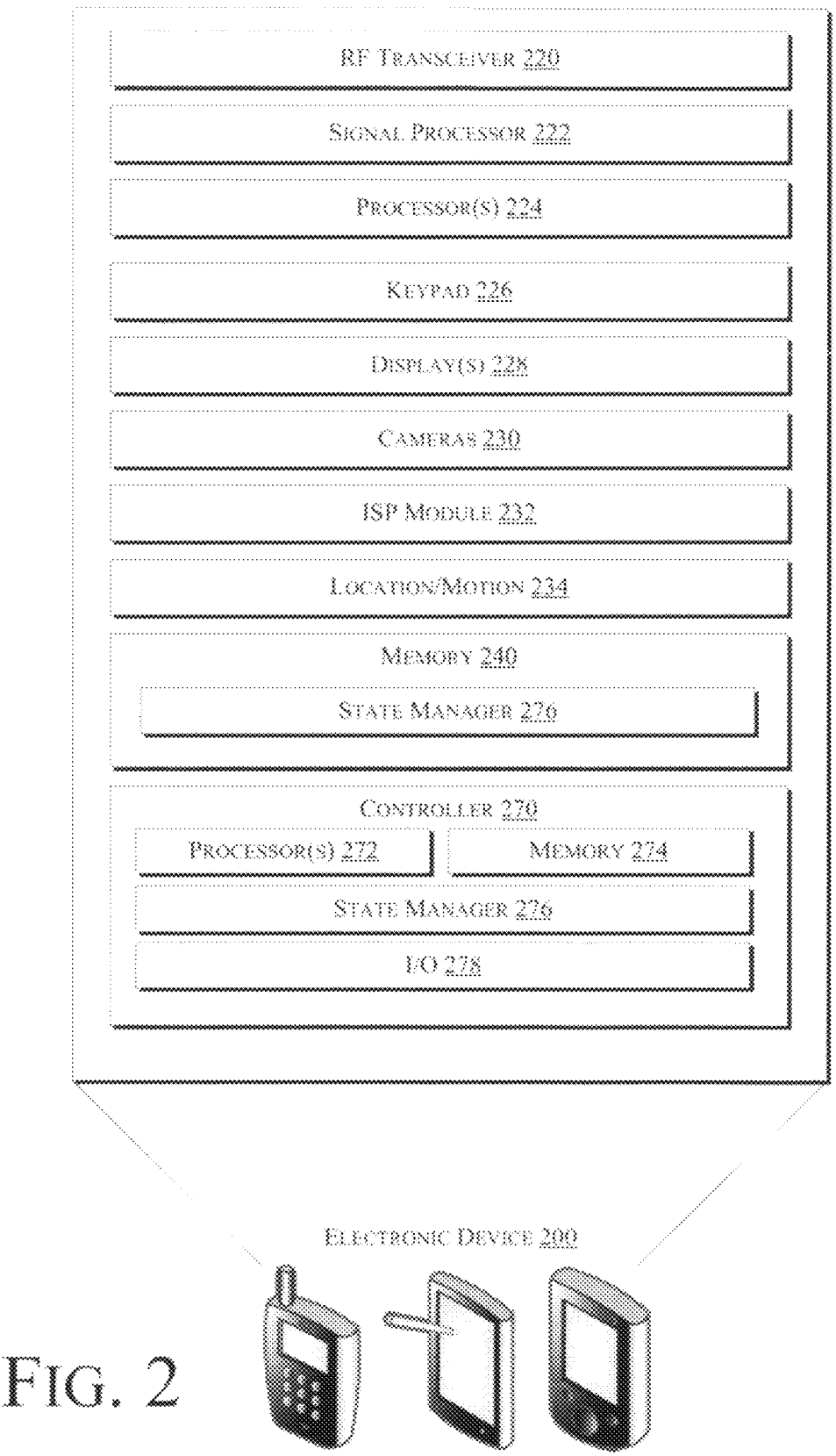

FIG. 2 is a schematic illustration of another embodiment of an electronic device 200 which may be adapted to implement user detection and recognition, according to embodiments. In some embodiments electronic device 210 may be embodied as a mobile telephone, a personal digital assistant (PDA), a laptop computer, or the like. Electronic device 200 may include an RF transceiver 220 to transceive RF signals and a signal processing module 222 to process signals received by RF transceiver 220.

RF transceiver 220 may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 200 may further include one or more processors 224 and a memory module 240. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 224 may be one or more processors in the family of Intel® PXA27x processors available from Intel® Corporation of Santa Clara, Calif. Alternatively, other CPUs may be used, such as Intel's Itanium®, XEON™, ATOM™, and Celeron® processors. Also, one or more processors from other manufactures may be utilized. Moreover, the processors may have a single or multi core design.

In some embodiments, memory module 240 includes random access memory (RAM); however, memory module 240 may be implemented using other memory types such as dynamic RAM (DRAM), synchronous DRAM (SDRAM), and the like. Memory 240 may comprise one or more applications which execute on the processor(s) 222.

Electronic device 210 may further include one or more input/output interfaces such as, e.g., a keypad 226 and one or more displays 228. In some embodiments electronic device 210 comprises one or more camera modules 230 and an image signal processor 232 and one or more location/motion devices 234.

In some embodiments electronic device 210 may include a controller 270 which may be implemented in a manner analogous to that of controller 170, described above. In the embodiment depicted in FIG. 2 the adjunct controller 270 comprises one or more processor(s) 272, a memory module 274, a state manager 276, an I/O module 278. In some embodiments the memory module 274 may comprise a persistent flash memory module. The I/O module 278 may comprise a serial I/O module or a parallel I/O module. Again, because the adjunct controller 270 is physically separate from the main processor(s) 224, the adjunct controller 270 may be made secure, i.e., inaccessible to hackers such that it cannot be tampered with. In some examples portions of the state manager 276 may reside in the memory 240 of electronic device 200 and may be executable on one or more of the processors 222.

Figure 3:
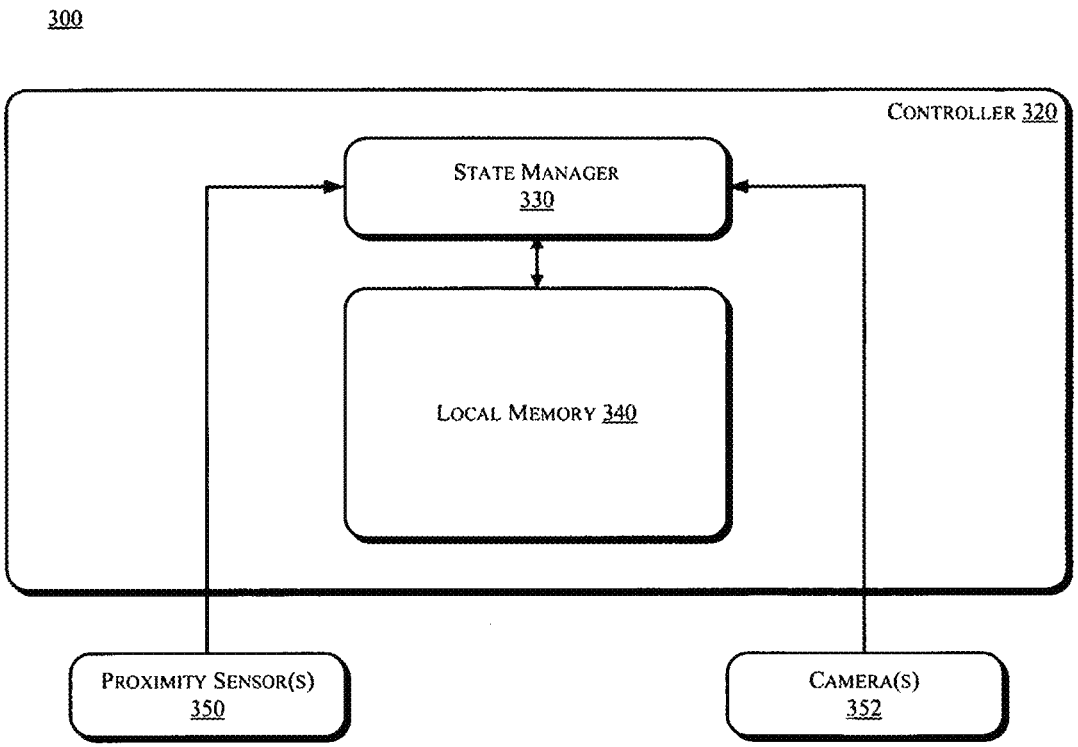
FIG. 3 is a high-level schematic illustration of an exemplary architecture for subsystem which may be adapted to implement user detection and recognition in accordance with some embodiments.

FIG. 3 is a high-level schematic illustration of an exemplary architecture for a subsystem 300 which may be adapted to implement user detection and recognition in accordance with some embodiments. Referring to FIG. 3, in some examples the subsystem 300 comprises a controller 320. Subsystem controller 320 may be implemented as a processor as described herein, or may be implemented as field programmable gate array (FPGA) or as a dedicated device, e.g., an application specific integrated circuit (ASIC).

Subsystem controller 320 may include logic defining one or more functional modules. In the example depicted in FIG. 3 the subsystem controller 320 includes logic which defines a state manager 330 and a local memory 340. State manager 330 may be communicatively coupled to one or more input devices such as proximity sensor(s) 350 and/or cameras 352. In some example state manager 330 may correspond to state manager 176 depicted in FIG. 1 or state manager 276 depicted in FIG. 2.

In some examples controller 320 may implement an interface compatible with the extensible host controller interface (xHCI) interface specification defined in the Universal Serial Bus (USB) 3.X (www.usb.org). Controller 320 may provide an interface to communication bus which may allow data to be passed between controller 320 and a host device, e.g., one or more processors in an electronic device such as device 100 or device 200.

In some examples the state manager 330 on controller 320 implements operations to implement user detection and recognition for electronic devices. Having described various structures of a system to implement an user recognition in electronic devices, operating aspects of a system will be explained with reference to FIGS. 4-5, which are flowcharts illustrating operations in methods to implement user detection and recognition for electronic devices in accordance with some examples. The operations depicted in the flowcharts of FIGS. 4A-4B and 5A-5B may be implemented by the state manager 330, alone or in combination with other component of electronic devices 100, 200.

Figure 4:
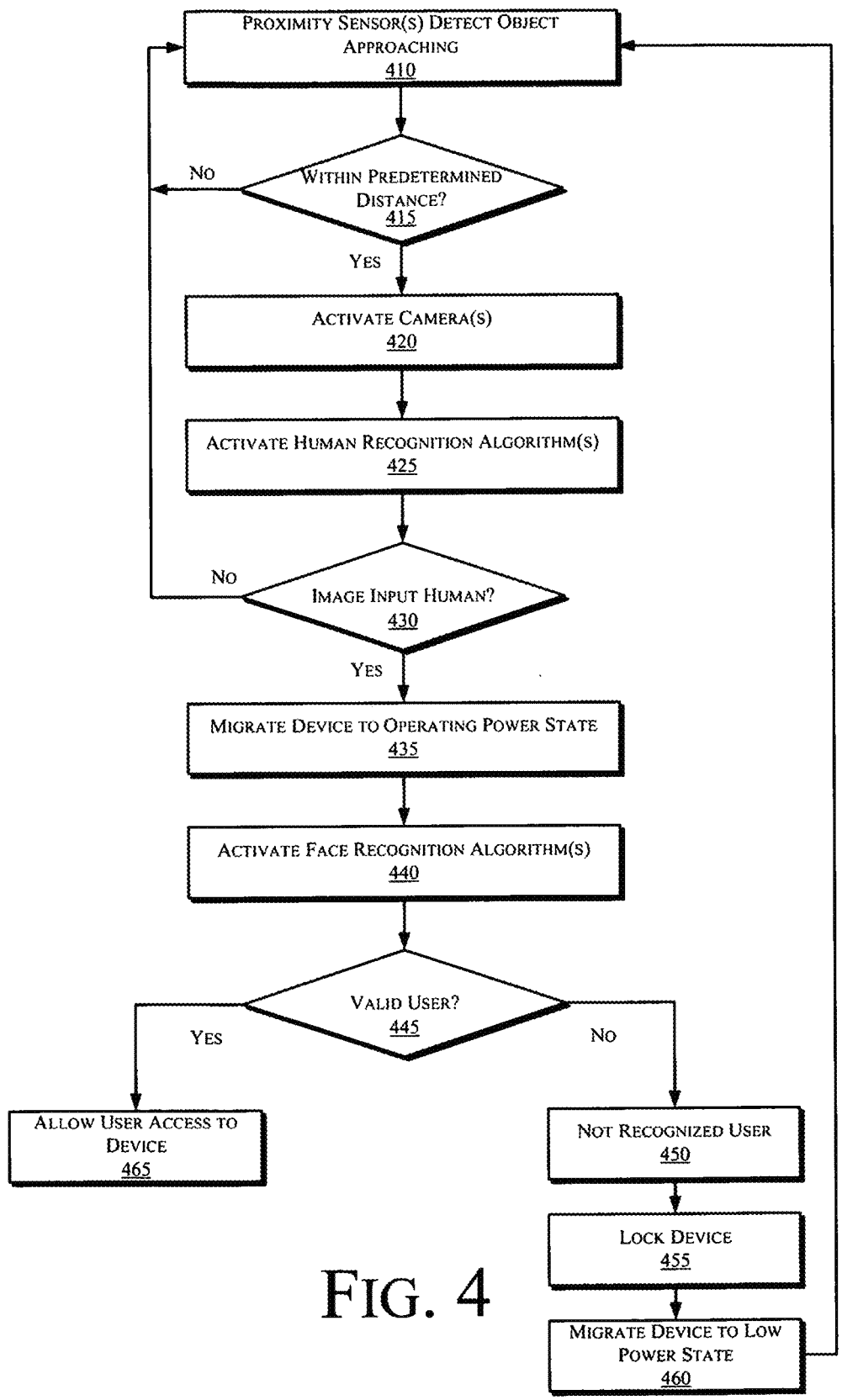
FIGS. 4-5 are flowcharts illustrating operations in methods to implement user detection and recognition in accordance with some embodiments.

In some examples an electronic device such as electronic device 100 or 200 implements operations which may be used to manage a power state of an electronic device based at least in part on inputs from sensors such as a proximity sensor(s) 350 and/or camera(s) 352. The operations depicted in FIG. 4 depict an example in which the state manager 330 may implement a "wake on approach" algorithm which wakes an electronic device 100/200 based on inputs from proximity sensor(s) 350 and/or camera(s) 352. The operations depicted in FIG. 4 may be implemented when an electronic device 100/200 is in a low-power state (i.e., a sleep state in which the central processor(s) are running a low-power state). Referring to FIG. 4, at operation 410 the proximity sensor(s) detect an object approaching the electronic device 100/200. The state manager 330 may receive outputs from the proximity sensor(s) and determine whether the object approaching the electronic device 100/200 is within a predetermined threshold. The threshold may be static (e.g., a fixed, predetermined distance) or may be adjusted dynamically in response to operation conditions or user settings. For example, the threshold may be set as a function of the power state in which the electronic device 100/200 is operating. Lower power states require more time to "wake" components of the electronic device. Thus, in some examples the distance threshold may be inversely proportional to the power state of the electronic device.

If the object approaching the electronic device is not within the predetermined distance, then control passes back to operation 410 and the state manager continues to monitor the output of the proximity sensor(s) 350. By contrast, if at operation 415 the object is within the predetermined distance then control passes to operation 420 and the state manager 330 activates one or more cameras 352 on the electronic device 100/200 in order to collect image information collected by the one or more camera(s) 352.

At operation 425 the state manager 330 activates one or more human recognition algorithms to determine whether an image input to the camera(s) 352 is a human. In some examples the human recognition algorithms convert image data collected by the camera(s) 352 into a histogram form without processing the image data in an image processor. This saves power and enhances the privacy of the electronic device.

At operation 430 the state manager 330 determines whether the image input to the camera(s) 352 is a human. By way of example, the histogram data generated by the image input to the camera(s) 352 may be compared to preconfigured histogram data characteristic of humanoid forms stored in local memory 340. If, at operation 430 the comparison indicates that the image input to the camera(s) 352 is not human then control passes back to operation 410.

By contrast, if at operation 430 the comparison indicates that the image input to the camera(s) 352 is human then control passes to operation 435 and the state manager migrates the electronic device 100/200 from the first low power state to an operating power state which may be higher power state than the first low power state in which the electronic device 100/200 was operating. At operation 440 the state manager 330 actives one or more face recognition algorithms to determine whether the image input to the camera(s) 352 represents the face of an authorized user of the electronic device 100/200. In some examples the face recognition algorithms convert image data collected by the camera(s) 352 into a histogram form without processing the image data in an image processor. This saves power and enhances the privacy of the electronic device.

At operation 445 the state manager 330 determines whether the image input to the camera(s) 352 represents the face of an authorized user of the electronic device 100/200. By way of example, the histogram data generated by the image input to the camera(s) 352 may be compared to preconfigured histogram data characteristic of human faces of authorized users stored in local memory 340. If, at operation 445 the comparison indicates that the image input to the camera(s) 352 is not an authorized user then control passes to operation 450 and the state manager 330 may generate a signal which indicates that the person approaching the electronic device 100/200 is not an authorized user of the device 100/200. At operation 455 the state manager 330 locks the electronic device and at operation 460 the state manager 330 migrates the electronic device 100/200 back to the first low-power state and control then passes back to operation 410.

By contrast, if at operation 445 the comparison indicates that the image input to the camera(s) 352 represents the face of an authorized user then control passes to operation 465 and the state manager 330 allows the user to access the electronic device 100/200.

Figure 5:
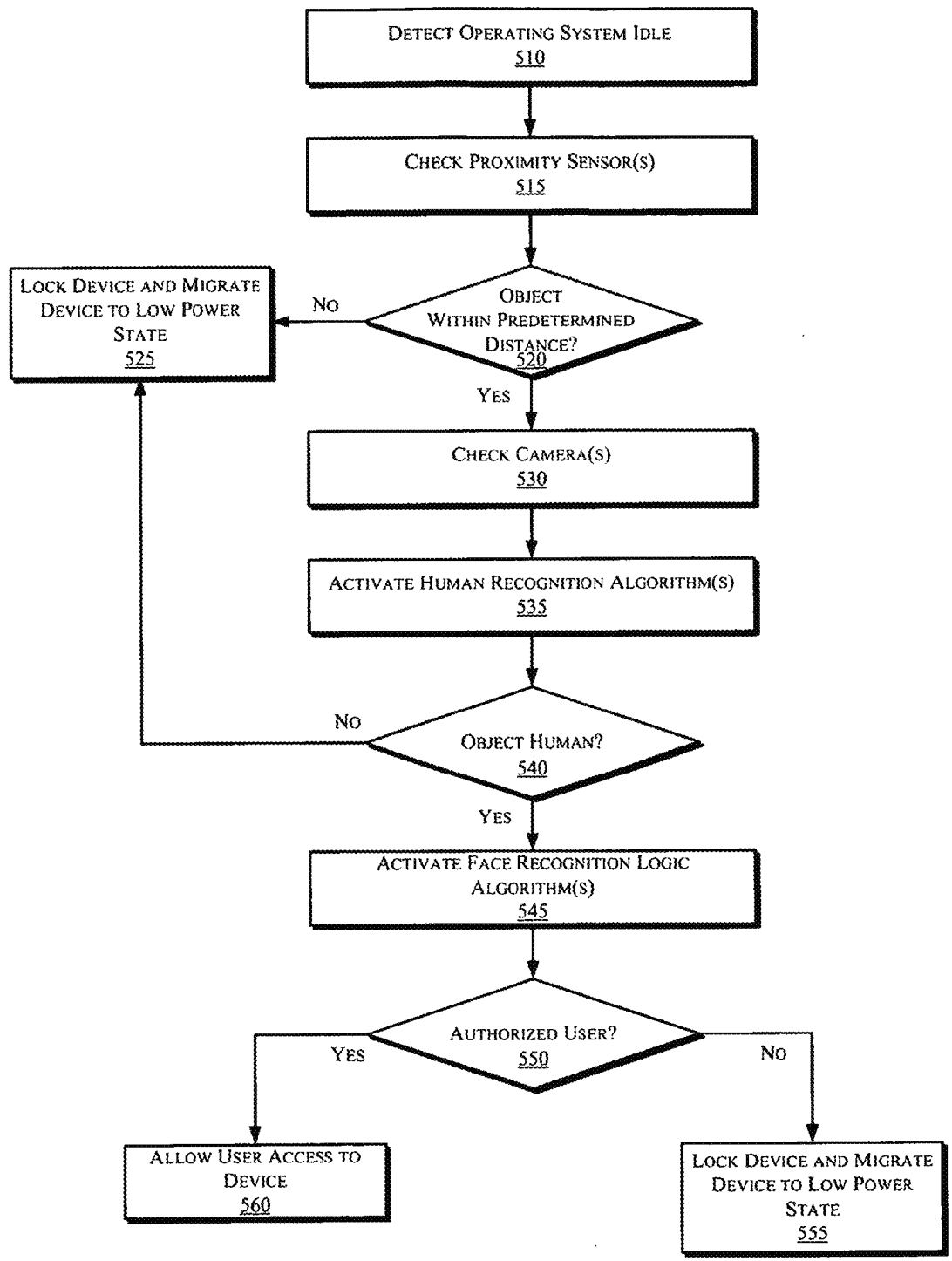

Thus, the operations depicted in FIG. 4 enable the state manager 330 to implement a "wake on approach" authorization scheme for an electronic device 100/200. FIG. 5 depicts operations in a "walk away lock" scheme for the electronic device 100/200. Referring to FIG. 5, at operation 510 the state manager 330 detects that the operating system of the electronic device 100/200 has gone idle, e.g., due to inactivity for a predetermined period of time. At operation 515 the state manager 330 checks the output of the proximity sensor(s) 350 to determine whether the object proximate the electronic device 100/200 is within a predetermined threshold. Again, the threshold may be static (e.g., a fixed, predetermined distance) or may be adjusted dynamically in response to operation conditions or user settings. For example, the threshold may be set as a function of the power state in which the electronic device 100/200 is operating. Lower power states require more time to "wake" components of the electronic device. Thus, in some examples the distance threshold may be inversely proportional to the power state of the electronic device.

If the object proximate the electronic device is not within the predetermined distance, then control passes to operation 525 and the state manager 330 locks the electronic device and migrates the electronic device 100/200 to a low-power state. The state manager may then revert back to the operations depicted in FIG. 4.

By contrast, if at operation 520 the output of the proximity detector(s) 350 indicate that an object is within the predetermined distance then control passes to operation 535 and the state manager 330 monitors the outputs of the one or more cameras 352 on the electronic device 100/200 in order to collect image information collected by the one or more camera(s) 352.

At operation 535 the state manager 330 activates one or more human recognition algorithms to determine whether an image input to the camera(s) 352 is a human. In some examples the human recognition algorithms convert image data collected by the camera(s) 352 into a histogram form without processing the image data in an image processor. This saves power and enhances the privacy of the electronic device.

At operation 540 the state manager 330 determines whether the image input to the camera(s) 352 is a human. By way of example, the histogram data generated by the image input to the camera(s) 352 may be compared to preconfigured histogram data characteristic of humanoid forms stored in local memory 340. If, at operation 540 the comparison indicates that the image input to the camera(s) 352 is not human then control passes back to operation 525 and the state manager 330 migrates the electronic device 100/200 to a low-power state. The state manager may then revert back to the operations depicted in FIG. 4.

By contrast, if at operation 540 the comparison indicates that the image input to the camera(s) 352 is human then control passes to operation 545 and the state manager 330 actives one or more face recognition algorithms to determine whether the image input to the camera(s) 352 represents the face of an authorized user of the electronic device 100/200. In some examples the face recognition algorithms convert image data collected by the camera(s) 352 into a histogram form without processing the image data in an image processor. This saves power and enhances the privacy of the electronic device.

At operation 550 the state manager 330 determines whether the image input to the camera(s) 352 represents the face of an authorized user of the electronic device 100/200. By way of example, the histogram data generated by the image input to the camera(s) 352 may be compared to preconfigured histogram data characteristic of human faces of authorized users stored in local memory 340. If, at operation 550 the comparison indicates that the image input to the camera(s) 352 is not an authorized user then control passes to operation 555 and the state manager 330 locks the electronic device 100/200 to deny access to the device 100/200 and migrates the electronic device to the low power state.

By contrast, if at operation 550 the comparison indicates that the image input to the camera(s) 352 represents the face of an authorized user then control passes to operation 560 and the state manager 330 allows the user to access the electronic device 100/200.

Figure 6:
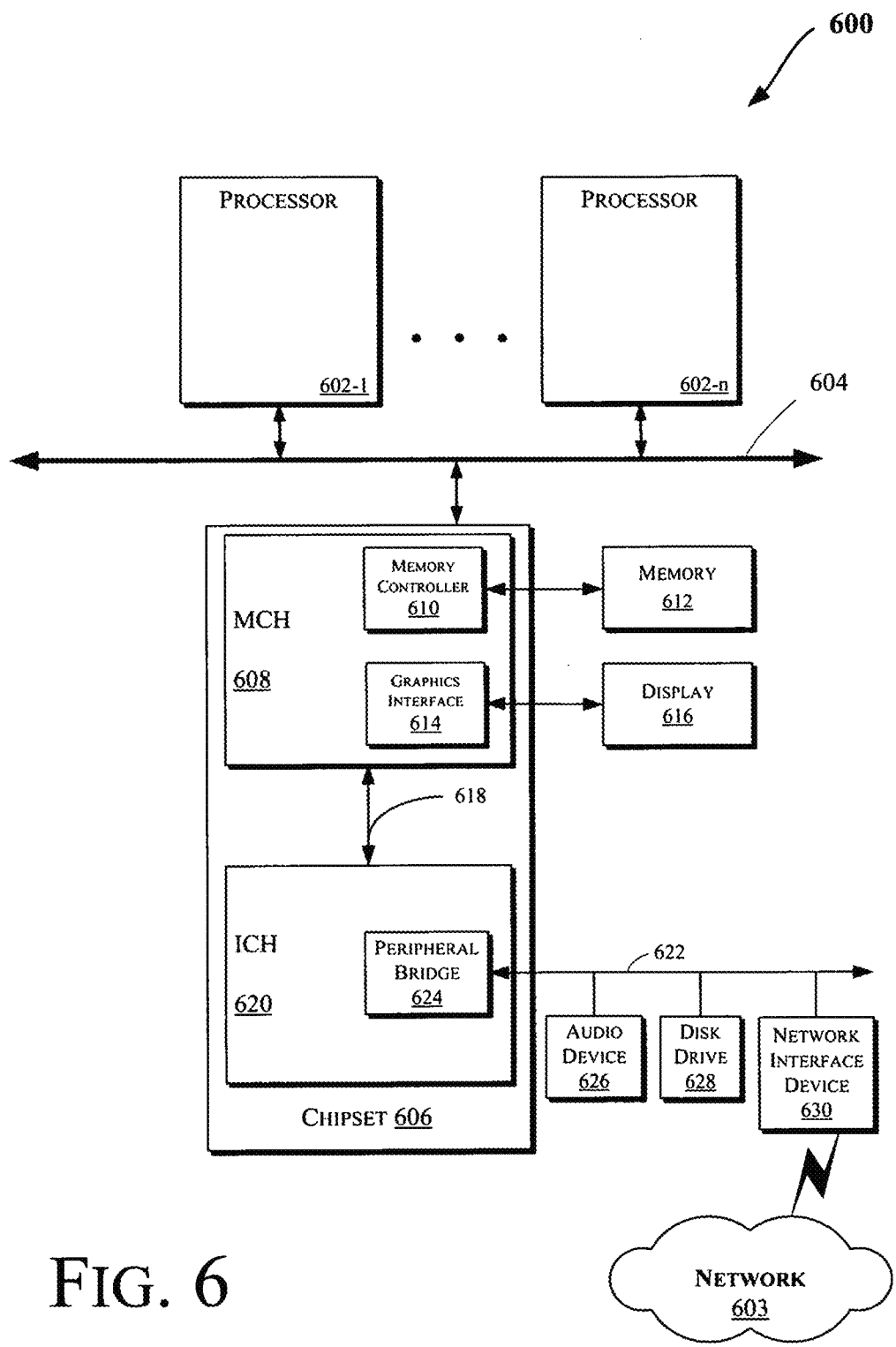
FIGS. 6-10 are schematic illustrations of electronic devices which may be adapted to implement user detection and recognition in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1.

A chipset 606 may also communicate with the interconnection network 604. The chipset 606 may include a memory control hub (MCH) 608. The MCH 608 may include a memory controller 610 that communicates with a memory 612. The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
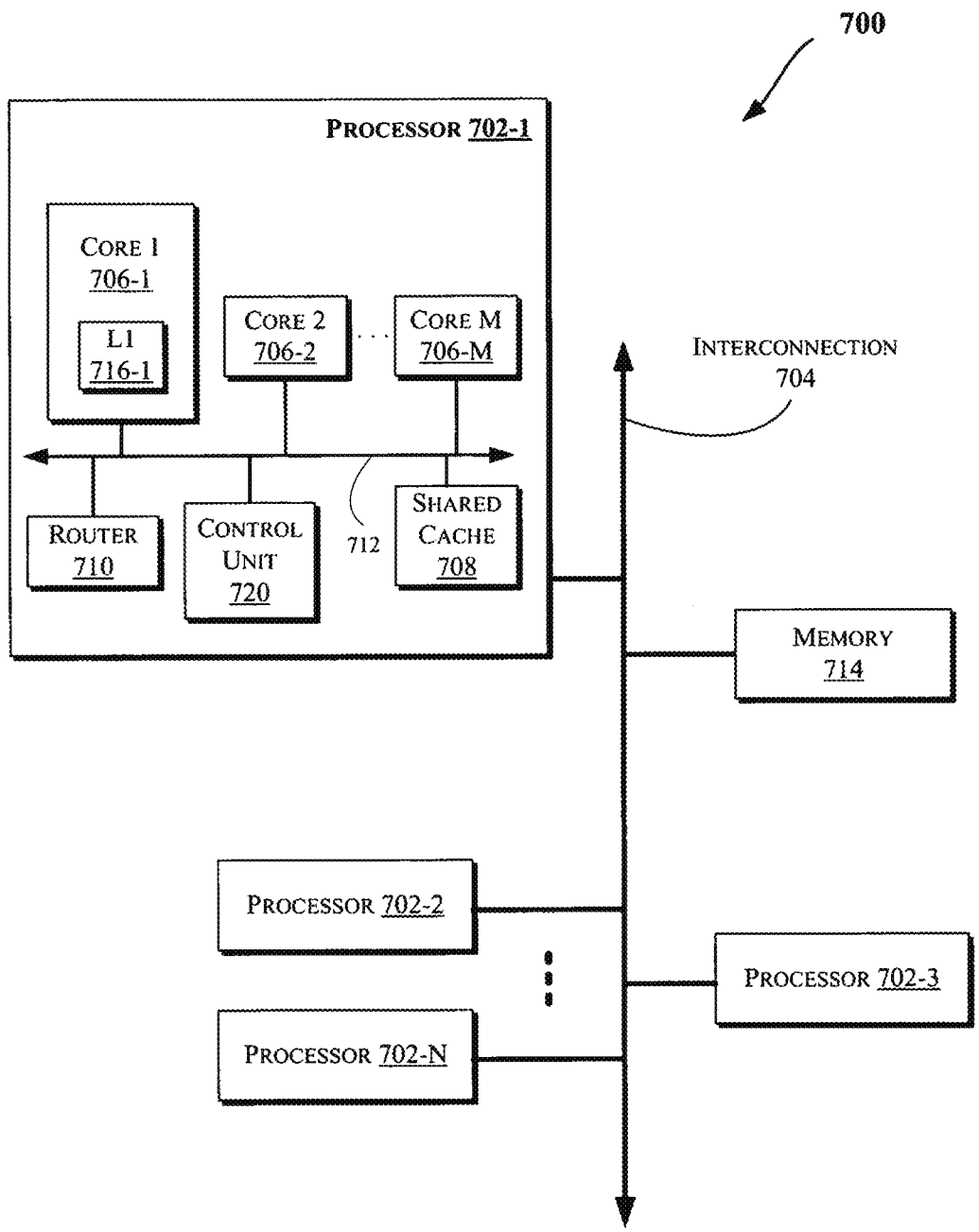

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716").

Figure 8:
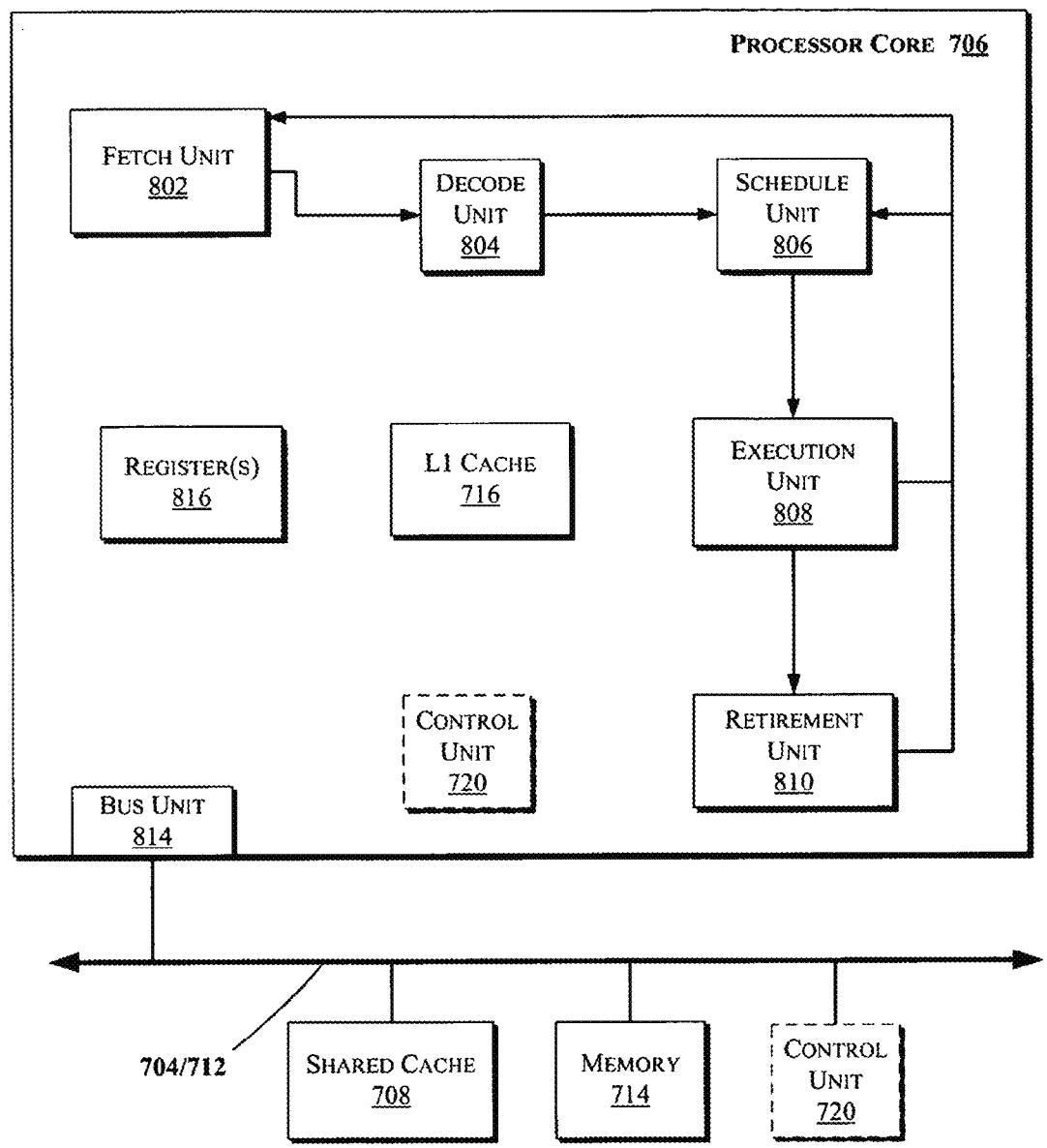

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
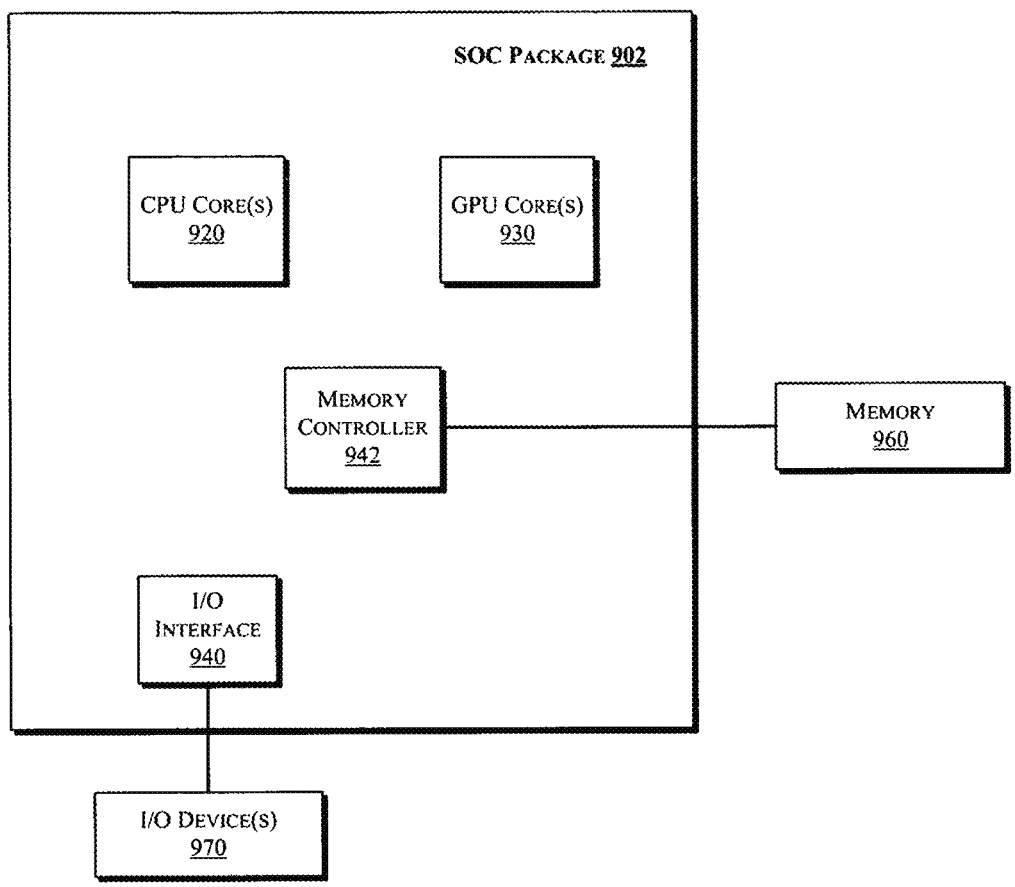

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
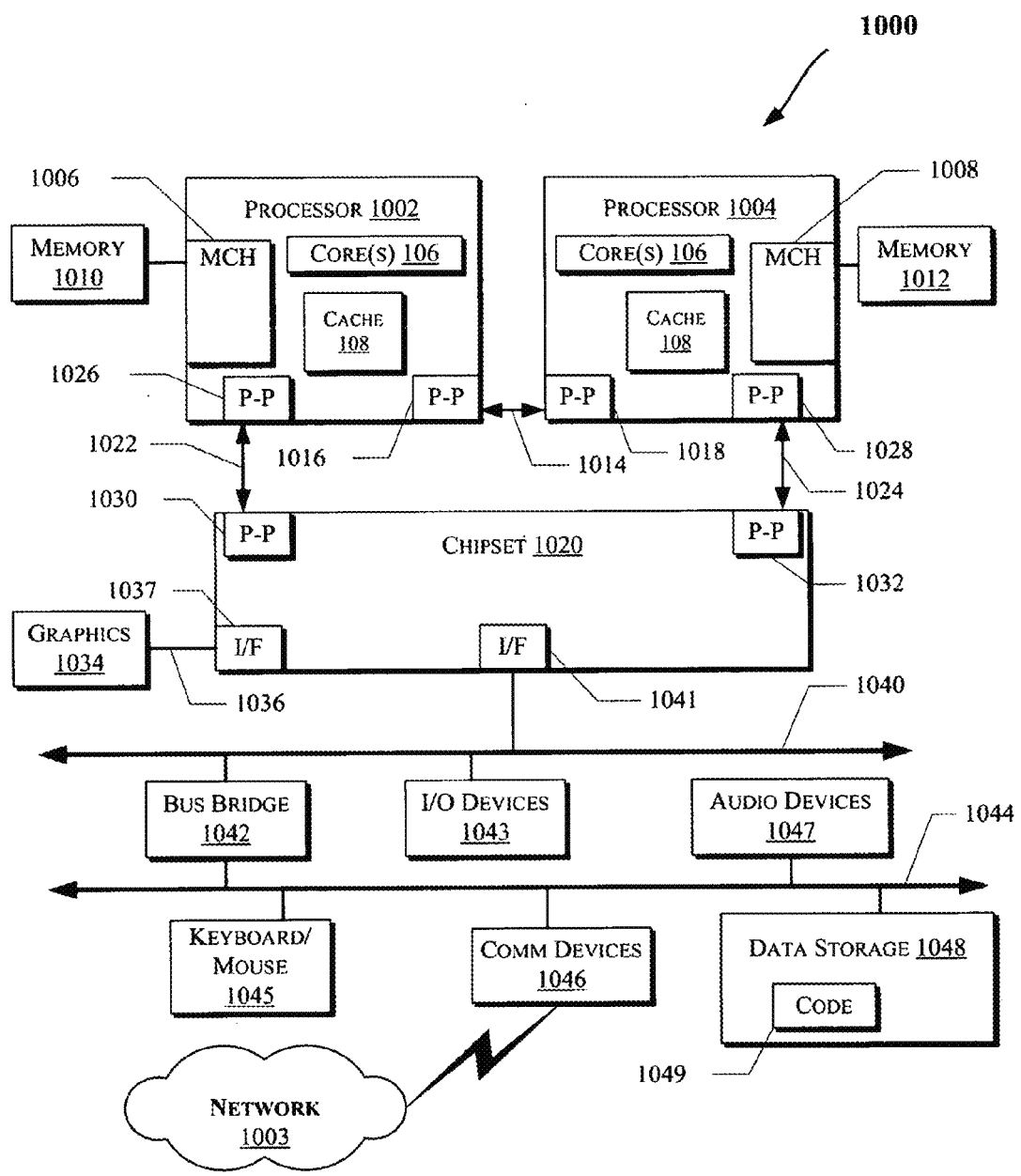

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is electronic device, comprising a proximity detector, a camera, and a controller, comprising logic, at least partly including hardware logic, to receive, from the proximity sensor, an indication that an object approaching the electronic device is within a predetermined distance while the electronic device is in a first low-power state, and in response to the indication, to activate the camera on the electronic device while the electronic device remains in a low-power state and determine whether an image input to the camera is a human while the electronic device remains in a low-power state.

In Example 2, the subject matter of Example 1 can optionally include logic, at least partly including hardware logic, which, in response to a determination that the image input is a human, is to transition the electronic device back from the first low-power state to a second power state.

In Example 3, the subject matter of any one of Examples 1-2 can optionally include logic, at least partly including hardware logic, which, in response to a determination that the image is a human, is to activate at least one face-recognition module on the electronic device.

In Example 4, the subject matter of any one of Examples 1-3 can optionally include logic, at least partly including hardware logic, to determine whether an image input to the camera is a face of an authorized user of the electronic device, and in response to a determination that the image is not the face of an authorized user of the electronic device, to present an unrecognized user message on a display of the electronic device, and present a manual login option on the display.

In Example 5, the subject matter of any one of Examples 1-4 can optionally include logic, at least partly including hardware logic, to determine whether an image input to the camera is a face of an authorized user of the electronic device, and in response to a determination that the image is the face of an authorized user of the electronic device, to allow the authorized user to access the electronic device.

In Example 6, the subject matter of any one of Examples 1-5 can optionally include logic, at least partly including hardware logic, to detect that an operating system on the electronic device has gone idle due to inactivity, and in response thereto, to receive an input from the proximity sensor and the camera.

In Example 7, the subject matter of any one of Examples 1-6 can optionally include logic, at least partly including hardware logic, to determine, from the proximity sensor, an indication that there is not an object within a predetermined distance, and in response to the indication, to transition the electronic device from an operating power state to the first low-power state.

In Example 8, the subject matter of any one of Examples 1-7 can optionally include logic, at least partly including hardware logic, to receive, from the proximity sensor, an indication that there is an object within a predetermined distance, determine whether an image input to the camera is not a human, and in response to a determination that the image is not a human, to transition the electronic device from an operating power state to the first low-power state.

In Example 9, the subject matter of any one of Examples 1-8 can optionally include logic, at least partly including hardware logic, to receive, from the proximity sensor, an indication that there is an object within a predetermined distance, determine whether an image input to the camera is not a human, and in response to a determination that the image is not a human, to transition the electronic device from an operating power state to the first low-power state.

In Example 10, the subject matter of any one of Examples 1-9 can optionally include logic, at least partly including hardware logic, to receive, from the proximity sensor, an indication that there is an object within a predetermined distance, determine whether an image input to the camera is a face of an authorized user of the electronic device, and in response to a determination that the image is the face of an authorized user of the electronic device, to allow the authorized user to access the electronic device.

Example 11 is a controller, comprising logic, at least partly including hardware logic, to receive, from a proximity sensor, an indication that an object approaching an electronic device coupled to the controller is within a predetermined distance while the electronic device is in a first low-power state, and in response to the indication, to activate a camera on the electronic device while the electronic device remains in a low-power state, and determine whether an image input to the camera is a human while the electronic device remains in a low-power state.

In Example 12, the subject matter of Example 1 can optionally include logic, at least partly including hardware logic, which, in response to a determination that the image input is a human, is to transition the electronic device back from the first low-power state to a second power state.

In Example 13, the subject matter of any one of Examples 11-12 can optionally include logic, at least partly including hardware logic, which, in response to a determination that the image is a human, is to activate at least one face-recognition module on the electronic device.

In Example 14, the subject matter of any one of Examples 11-13 can optionally include logic, at least partly including hardware logic, to determine whether an image input to the camera is a face of an authorized user of the electronic device, and in response to a determination that the image is not the face of an authorized user of the electronic device, to present an unrecognized user message on a display of the electronic device, and present a manual login option on the display.

In Example 15, the subject matter of any one of Examples 11-14 can optionally include logic, at least partly including hardware logic, to determine whether an image input to the camera is a face of an authorized user of the electronic device, and in response to a determination that the image is the face of an authorized user of the electronic device, to allow the authorized user to access the electronic device.

In Example 16, the subject matter of any one of Examples 11-15 can optionally include logic, at least partly including hardware logic, to detect that an operating system on the electronic device has gone idle due to inactivity, and in response thereto, to receive an input from the proximity sensor and the camera.

In Example 17, the subject matter of any one of Examples 11-16 can optionally include logic, at least partly including hardware logic, to determine, from the proximity sensor, an indication that there is not an object within a predetermined distance, and in response to the indication, to transition the electronic device from an operating power state to the first low-power state.

In Example 18, the subject matter of any one of Examples 11-17 can optionally include logic, at least partly including hardware logic, to receive, from the proximity sensor, an indication that there is an object within a predetermined distance, determine whether an image input to the camera is not a human, and in response to a determination that the image is not a human, to transition the electronic device from an operating power state to the first low-power state.

In Example 19, the subject matter of any one of Examples 11-18 can optionally include logic, at least partly including hardware logic, to receive, from the proximity sensor, an indication that there is an object within a predetermined distance, determine whether an image input to the camera is not a human, and in response to a determination that the image is not a human, to transition the electronic device from an operating power state to the first low-power state.

In Example 20, the subject matter of any one of Examples 11-19 can optionally include logic, at least partly including hardware logic, to receive, from the proximity sensor, an indication that there is an object within a predetermined distance, determine whether an image input to the camera is a face of an authorized user of the electronic device, and in response to a determination that the image is the face of an authorized user of the electronic device, to allow the authorized user to access the electronic device.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An electronic device, comprising:
    a proximity detector;
    a camera; and
    a controller, comprising logic, at least partly including hardware logic, to:
        receive, from the proximity sensor, an indication that an object approaching the electronic device is within a predetermined distance while the electronic device is in a first low-power state, and in response to the indication, to:
        activate the camera on the electronic device while the electronic device remains in a low-power state;
        determine whether an image input to the camera is a human while the electronic device remains in a low-power state; and
        determine whether an image input to the camera is a face of an authorized user of the electronic device, and in response to a determination that the image is not the face of an authorized user of the electronic device, to:
            present an unrecognized user message on a display of the electronic device; and
            present a manual login option on the display.
2. The electronic device of claim 1, wherein the controller further comprises logic, at least partly including hardware logic which, in response to a determination that the image input is a human, is to:
    transition the electronic device back from the first low-power state to a second power state.
3. The electronic device of claim 1, wherein the controller further comprises logic, at least partly including hardware logic which, in response to a determination that the image is a human, is to:
    activate at least one face-recognition module on the electronic device.
4. The electronic device of claim 1, wherein the controller further comprises logic, at least partly including hardware logic, to determine whether an image input to the camera is a face of an authorized user of the electronic device, and in response to a determination that the image is the face of an authorized user of the electronic device, to:
    allow the authorized user to access the electronic device.
5. The electronic device of claim 4, wherein the controller further comprises logic, at least partly including hardware logic, to:
    detect that an operating system on the electronic device has gone idle due to inactivity, and in response thereto, to receive an input from the proximity sensor and the camera.
6. The electronic device of claim 5, wherein the electronic device further comprises logic, at least partly including hardware logic, to:
    determine, from the proximity sensor, an indication that there is not an object within a predetermined distance, and in response to the indication, to:
        transition the electronic device from an operating power state to the first low-power state.
7. The electronic device of claim 5, wherein the electronic device further comprises logic, at least partly including hardware logic, to:
    receive, from the proximity sensor, an indication that there is an object within a predetermined distance;
    determine whether an image input to the camera is not a human, and in response to a determination that the image is not a human, to:
        transition the electronic device from an operating power state to the first low-power state.
8. The electronic device of claim 5, wherein the electronic device further comprises logic, at least partly including hardware logic, to:
    receive, from the proximity sensor, an indication that there is an object within a predetermined distance;
    determine whether an image input to the camera is not a human, and in response to a determination that the image is not a human, to:
        transition the electronic device from an operating power state to the first low-power state.
9. The electronic device of claim 5, wherein the electronic device further comprises logic, at least partly including hardware logic, to:
    receive, from the proximity sensor, an indication that there is an object within a predetermined distance;
    determine whether an image input to the camera is a face of an authorized user of the electronic device, and in response to a determination that the image is the face of an authorized user of the electronic device, to:
    allow the authorized user to access the electronic device.
10. A controller, comprising logic, at least partly including hardware logic, to:
    receive, from a proximity sensor, an indication that an object approaching an electronic device coupled to the controller is within a predetermined distance while the electronic device is in a first low-power state, and in response to the indication, to:

activate a camera on the electronic device while the electronic device remains in a low-power state;

determine whether an image input to the camera is a human while the electronic device remains in a low-power state; and determine whether an image input to the camera is a face of an authorized user of the electronic device, and in response to a determination that the image is not the face of an authorized user of the electronic device, to:

present an unrecognized user message on a display of the electronic device; and present a manual login option on the display.

11. The controller of claim 10, wherein the controller further comprises logic, at least partly including hardware logic which, in response to a determination that the image input is a human, is to:

transition the electronic device back from the first low-power state to a second power state.

12. The controller of claim 10, wherein the controller further comprises logic, at least partly including hardware logic which, in response to a determination that the image is a human, is to:

activate at least one face-recognition module on the electronic device.

13. The controller of claim 10, wherein the controller further comprises logic, at least partly including hardware logic, to determine whether an image input to the camera is a face of an authorized user of the electronic device, and in response to a determination that the image is the face of an authorized user of the electronic device, to:

allow the authorized user to access the electronic device.

14. The controller of claim 13, wherein the controller further comprises logic, at least partly including hardware logic, to:

detect that an operating system on the electronic device has gone idle due to inactivity, and in response thereto, to receive an input from the proximity sensor and the camera.

15. The controller of claim 14, wherein the electronic device further comprises logic, at least partly including hardware logic, to:

determine, from the proximity sensor, an indication that there is not an object within a predetermined distance, and in response to the indication, to:

transition the electronic device from an operating power state to the first low-power state.

16. The controller of claim 14, wherein the electronic device further comprises logic, at least partly including hardware logic, to:

receive, from the proximity sensor, an indication that there is an object within a predetermined distance;

determine whether an image input to the camera is not a human, and in response to a determination that the image is not a human, to:

transition the electronic device from an operating power state to the first low-power state.

17. The controller of claim 14, wherein the electronic device further comprises logic, at least partly including hardware logic, to:

receive, from the proximity sensor, an indication that there is an object within a predetermined distance;

determine whether an image input to the camera is not a human, and in response to a determination that the image is not a human, to:

transition the electronic device from an operating power state to the first low-power state.

18. The controller of claim 14, wherein the electronic device further comprises logic, at least partly including hardware logic, to:

receive, from the proximity sensor, an indication that there is an object within a predetermined distance;

determine whether an image input to the camera is a face of an authorized user of the electronic device, and in response to a determination that the image is the face of an authorized user of the electronic device, to:

allow the authorized user to access the electronic device.

* * * * *

UNITED STATES PATENT AND TRADEMARK OFFICE
CERTIFICATE OF CORRECTION

PATENT NO. : 9,769,307 B2  
APPLICATION NO. : 14/998071  
DATED : September 19, 2017  
INVENTOR(S) : Schrage et al.

Page 1 of 1

It is certified that error appears in the above-identified patent and that said Letters Patent is hereby corrected as shown below:

On the Title Page

In Column 1, in item (72) insert -- Tamir -- before Damian Munafo

Signed and Sealed this  
Eighteenth Day of September, 2018

Andrei Iancu  
*Director of the United States Patent and Trademark Office*